Patented Feb. 18, 1936

2,031,481

UNITED STATES PATENT OFFICE 2,031,481

SYNTHETIC RESIN AND METHOD OF PREPARATION

Caryl P. Haskins, Schenectady, N. Y., assignor to General Electric Company, a corporation of New York No Drawing. Application March 23, 1934,
Serial No. 717,084

3 Claims. (Cl. 260—8)

This invention relates to synthetic resins and method of preparation of such resins. More specifically the present invention relates to an alkyd type resin prepared from unsaturated aliphatic hydrocarbons of the general formula $C_nH_{2n-2}$ containing two double bonds which may or may not be conjugate.

Broadly speaking, my invention comprises the production of resinous compositions by the reaction of a diolefine with maleic anhydride and a polyhydric alcohol.

In order to illustrate but not to limit the invention the following detailed example of the preparation of a resin in accordance therewith is given:

Cuprene, which may be prepared either chemically or by the action of high voltage cathode rays, is illustrative of a diolefine which may be used in accordance with the present invention. Cuprene is the name given to certain polymerization products containing 0.2 to 0.3% copper. It may be prepared from acetylene by passing the latter under pressure over copper or cupriferous bronze powders at a temperature of 200° to 260° C. and in the presence of a suitable electrical discharge. Its constitution is believed to be $(C_2H_2)_{20}$; it is generally chemically inert and very slightly soluble in most organic solvents.

The solid cuprene is heated with maleic anhydride in combining proportions to the boiling point of the latter until the solid is thoroughly dispersed. The product is then reacted with glycerine as typical of any polyhydric alcohol. The reaction is carried on at a temperature of 85° to 100° C. for 10 to 20 hours followed by a further heating to 185° to 200° C. for 5 to 10 hours to complete condensation.

Changes in color and in physical properties of the final resin may be effected by varying the proportions of constituents used, by introducing such condensation catalysts as $ZnCl_2$ and $AlCl_3$ and by filtering off excess solid cuprene.

Resins thus prepared, with or without catalysts, are harder and tougher than the corresponding maleic anhydride-glycerine resins similarly prepared.

It is believed that the reaction, in part, consists of a rearrangement of cuprene and maleic anhydride to form a compound of phthalic configuration which then reacts with the polyhydric alcohol to form the resin.

While the invention has been illustrated specifically with reference to cuprene, it is applicable to any diolefine thus providing a simple way of introducing desired radicals into the resin. For example, divinyl acetylene, or partially polymerized rubber compounds such as isoprene may be used.

What I claim as new and desire to secure by Letters Patent of the United States is:

1. A resin produced by reacting cuprene, maleic anhydride and polyhydric alcohol.

2. An alkyd type resin formed by heating cuprene, maleic anhydride and glycerine.

3. The method of making a resin of the alkyd type which includes reacting at an elevated temperature cuprene, maleic anhydride and polyhydric alcohol.

CARYL P. HASKINS.